United States Patent [19]
Liu

[11] Patent Number: 6,069,798
[45] Date of Patent: May 30, 2000

[54] ASYMMETRICAL POWER CONVERTER AND METHOD OF OPERATION THEREOF

[75] Inventor: Rui Liu, Plano, Tex.

[73] Assignee: Lucent Technologies Inc., Murray Hill, N.J.

[21] Appl. No.: 09/231,520

[22] Filed: Jan. 14, 1999

[51] Int. Cl.[7] .................................................. H02M 3/335
[52] U.S. Cl. ............................ 363/16; 363/24; 363/134
[58] Field of Search .................................. 363/15, 16, 20, 363/21, 24, 25, 95, 97, 131, 132, 134

[56] References Cited

U.S. PATENT DOCUMENTS

| | | | |
|---|---|---|---|
| 4,685,039 | 8/1987 | Inou et al. | 363/16 |
| 5,146,394 | 9/1992 | Ishii et al. | 363/16 |
| 5,351,175 | 9/1994 | Blankenship | 363/16 |
| 5,459,650 | 10/1995 | Noro | 363/24 |
| 5,838,552 | 11/1998 | Fraidlin et al. | 363/16 |
| 5,907,479 | 5/1999 | Leu | 363/16 |

OTHER PUBLICATIONS

U.S. Patent Application Serial No. 09/072,389, filed on May 4, 1998, entitled "Cross–Conduction Limiting Circuit, Method of Operation Thereof and DC/DC Converter Employing the Same" by Yehoshua Mandelcorn and Heng-chun Mao.

*Primary Examiner*—Adolf Deneke Berhane

[57] ABSTRACT

An asymmetrical power converter and method of operation thereof. In one embodiment, the asymmetrical power converter includes (1) an isolation transformer having series-coupled first and second primary windings providing differing turns ratios therefrom, (2) a first power switch and a first input capacitor series-coupled to the first primary winding to form a first circulation path between the isolation transformer and an input of the asymmetrical power converter and (3) a second power switch and a second input capacitor series-coupled to the second primary winding to form a second circulation path between the isolation transformer and the input.

20 Claims, 2 Drawing Sheets

ASYMMETRICAL POWER CONVERTER AND METHOD OF OPERATION THEREOF

TECHNICAL FIELD OF THE INVENTION

The present invention is directed, in general, to power supplies and, more specifically, to an asymmetrical power converter and a method of operation thereof

BACKGROUND OF THE INVENTION

The development of high-efficiency power supplies in combination with a requirement of higher power density is a continuing goal in the field of power electronics. A switched-mode power converter is a frequently employed component of a power supply that converts an input voltage waveform into a specified output voltage waveform. There are several types of switched-mode converters including, for instance, an asymmetrical power converter.

A conventional asymmetrical power converter includes two (2) power switches coupled to a control circuit, at least one input/output isolation transformer, a rectifier and a filter. The asymmetrical power converter generally operates as follows. The first and second power switches conduct current in a complimentary manner to convert an input DC voltage into an AC voltage to be impressed across the isolation transformer. The rectifier then rectifies the voltage from the isolation transformer and the filter smooths and filters the rectified voltage to develop an output voltage for delivery to a load.

The control circuit monitors the output voltage of the asymmetrical power converter and adjusts the duty cycle of the power switches to ultimately control the output voltage. The output voltage may be maintained at a relatively constant level despite relative fluctuations in the input voltage and the load.

In conventional asymmetrical power converters, a voltage conversion ratio (i.e., a ratio of the output voltage to the input voltage) for a given duty cycle may be represented by a hyperbolic function. The voltage conversion ratio typically starts at zero at a 0% duty cycle, increases hyperbolically to a peak voltage conversion ratio of 0.5 at a 50% duty cycle and decreases to zero at a 100% duty cycle. The voltage conversion ratio is hyperbolic instead of linear (as in the full-bridge power converter) and the slope of the hyperbolic function decreases to about zero at duty cycles approximating 50%. The control circuit selects the duty cycle of the power switches and, therefore, the voltage conversion ratio, to produce a desired output voltage relative to the input voltage. Once the proper duty cycle is determined, however, small fluctuations in the input voltage or the load may result in related fluctuations in the output voltage. The control circuit should, therefore, adjust the duty cycle of the power switches to maintain the output voltage at a relatively constant level.

The hyperbolic relationship between the duty cycle and the voltage conversion ratio, however, poses a substantial problem. Since the slope of the hyperbolic function is about zero at duty cycles approximating 50%, incremental adjustments to the duty cycle may result in negligible changes in the voltage conversion ratio and, therefore, the output voltage. The control circuit is usually complex to account for the varying voltage conversion ratio with respect to duty cycle. Alternatively, if a simple control circuit is employed, the asymmetrical power converter may need to be operated at a duty cycle substantially less than 50%. While the relationship between the duty cycle and the voltage conversion ratio may be more linear at duty cycles substantially less than 50%, the voltage conversion ratio is also lower, thereby resulting in a lower output voltage for a given input voltage.

The lower voltage conversion ratio necessitates a higher input voltage, resulting in a higher reverse voltage stress on the rectifying diodes of the rectifier. Further, operating the asymmetrical power converter at duty cycles substantially less than 50% may result in a significant difference in conduction losses of the two power switches. To minimize the reverse voltage stress on the rectifying diodes, an asymmetrical power converter having a higher voltage conversion ratio is desired. Additionally, an asymmetrical power converter capable of operating at about a 50% duty cycle is desirable to more evenly distribute power dissipation between the two power switches.

U.S. Pat. No. 5,838,552, entitled "Asymmetrical Power Converter and Method of Operation Thereof," issued to Fraidlin, et al. on Nov. 17, 1998, describes an asymmetrical power converter employing two transformers. The aforementioned reference is incorporated herein by reference. Fraidlin discloses an asymmetrical power converter that employs multiple transformers having differing turns ratios to achieve a reduction in reverse voltage in a rectifier coupled to a secondary winding of each of the transformers. Multiple transformers, however, require a significant amount of board real-estate. Additionally, the transformers are employed to store energy during alternate switching cycles and may, therefore, be of significant size.

Accordingly, what is needed in the art is an asymmetrical power converter that, while reducing board real-estate, provides a well-regulated output, and, at the same time, more evenly distributes voltage stresses within the converter to thereby achieve a highly efficient and cost effective converter.

SUMMARY OF THE INVENTION

To address the above-discussed deficiencies of the prior art, the present invention provides an asymmetrical power converter and method of operation thereof. In one embodiment, the asymmetrical power converter includes (1) an isolation transformer having series-coupled first and second primary windings providing differing turns ratios therefrom, (2) a first power switch and a first input capacitor series-coupled to the first primary winding to form a first circulation path between the isolation transformer and an input of the asymmetrical power converter and (3) a second power switch and a second input capacitor series-coupled to the second primary winding to form a second circulation path between the isolation transformer and the input.

The present invention therefore introduces the broad concept of employing an isolation transformer having series-coupled first and second primary windings of differing numbers of turns to alter the hyperbolic relationship between the duty cycle and the voltage conversion ratio. The asymmetrical power converter may thus possess a higher voltage conversion ratio to thereby reduce reverse voltage stress on the rectifying diodes of the rectifier. Altering the hyperbolic relationship also allows the asymmetrical power converter of the present invention to be operated at a substantially 50% duty cycle to more evenly distribute power dissipation between the first and second power switches.

In one embodiment of the present invention, the series-coupled first and second primary windings are coupled between the first and second power switches. The leakage inductance of the isolation transformer thus protects the first and second power switches from shoot-through currents resulting from simultaneous conduction of the first and second power switches.

In one embodiment of the present invention, the asymmetrical power converter further includes a controller coupled to the first and second power switches. The controller alternately activates the first and second power switches to impress power from the input onto the isolation transformer. In a preferred embodiment, the controller activates the first power switch during a first interval for a first duty cycle (D) and alternately activates the second power switch during a second interval for a second duty cycle (1-D). The controller, therefore, monitors the output voltage and alternately activates the first and second power switches to regulate the output voltage.

In one embodiment of the present invention, the asymmetrical power converter further includes a rectifier coupled to an output of the asymmetrical power converter. The rectifier rectifies the voltage from the secondary winding to provide a rectified output voltage at the output. In a related embodiment, the rectifier is selected from the group consisting of (1) a current doubler rectifier and (2) a center-tapped rectifier. Of course, the use of other conventional rectifier topologies is well within the broad scope of the present invention.

In one embodiment of the present invention, the first and second power switches are selected from the group consisting of (1) metal oxide semiconductor field-effect transistors (MOSFETs), (2) bipolar junction transistors (BJTs), (3) insulated gate bipolar transistors (IGBTs) and (4) gate turn-off thyristors (GTOs). Those skilled in the art will understand that other controllable switches may be employed to advantage, depending upon the desired application.

In one embodiment of the present invention, the asymmetrical power converter includes an output filter, coupled to an output of the asymmetrical power converter. In a related embodiment, the output filter has an output inductor and an output capacitor. Of course, other conventional output filters may be employed in accordance with the principles of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
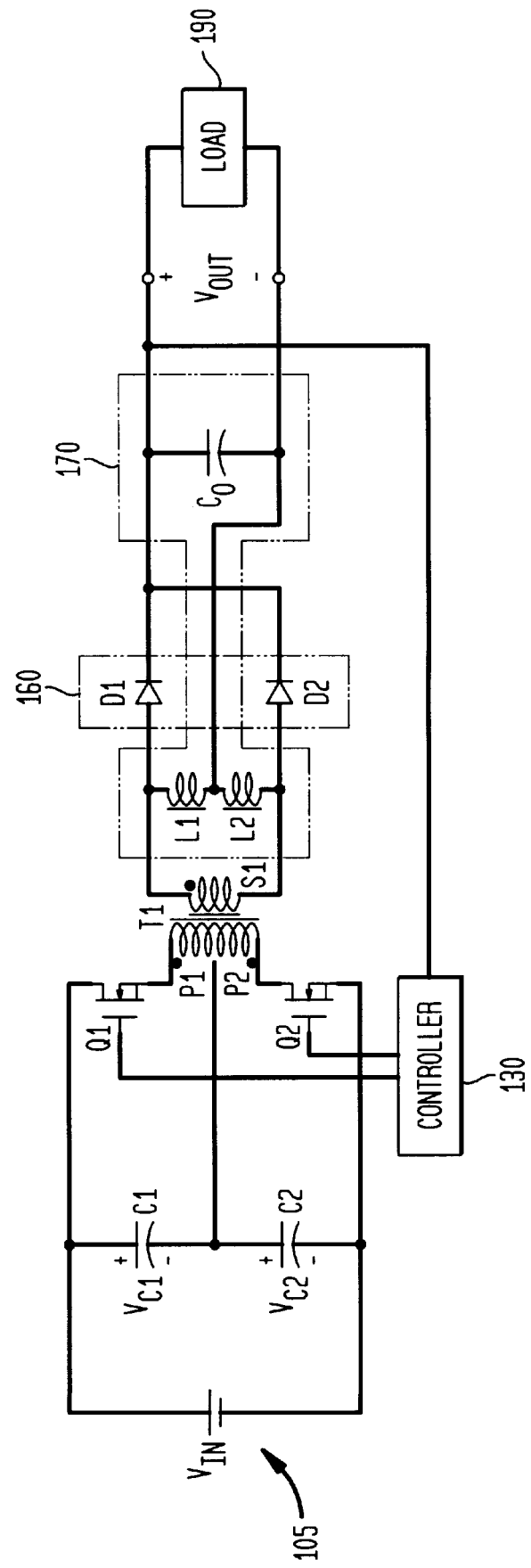
FIG. 1 illustrates an embodiment of an asymmetrical power converter constructed in accordance with the principles of the present invention.

Referring initially to FIG. 1, illustrated is an embodiment of an asymmetrical power converter 100 constructed in accordance with the principles of the present invention. The asymmetrical power converter 100 has an input couplable to a source of DC power 105 (having an input voltage Vin) and an output (having an output voltage Vout) couplable to a load 190.

In the illustrated embodiment, the asymmetrical power converter 100 includes an isolation transformer T1 having series-coupled first and second primary windings P1, P2 and a secondary winding S1. The first and second primary windings P1, P2 have differing turns ratios with respect to the secondary winding S1. Although the isolation transformer T1 is illustrated as having one secondary winding S1, in other advantageous embodiments, the isolation transformer T1 may have more than one secondary winding.

The asymmetrical power converter 100 further includes first and second power switches Q1, Q2 series-coupled to the first and second primary windings P1, P2, respectively. While the first and second power switches Q1, Q2 are illustrated as metal oxide semiconductor field-effect transistors (MOSFETs), other controllable switches, including bipolar junction transistors (BJTs), insulated gate bipolar transistors (IGBTs) and gate turn-off thyristors (GTOs) may also be employed to advantage.

The asymmetrical power converter 100 further includes a first input capacitor C1 coupled across the first power switch Q1 and the first primary winding P1. The first power switch Q1 and first input capacitor C1 are thus series-coupled to the first primary winding P1 to form a first circulation path between the isolation transformer T1 and the input. The asymmetrical power converter 100 further includes a second input capacitor C2 coupled across the second power switch Q2 and the second primary winding P2. The second power switch Q2 and second input capacitor C2 are thus series-coupled to the second primary winding P2 to form a second circulation path between the isolation transformer T1 and the input. The first and second input capacitors C1, C2 establish first and second voltages $V_{C1}$, $V_{C2}$ thereacross, respectively. The first and second voltages $V_{C1}$, $V_{C2}$ are impressed across the first and second primary windings by the first and second power switches Q1, Q2, respectively.

The asymmetrical power converter 100 further includes a rectifier 160, having first and second rectifying diodes D1, D2, coupled to the secondary winding S1. In the illustrated embodiment, the rectifier 160 is a current-doubler rectifier. Of course, any rectifier topology is well within the broad scope of the present invention. The rectifier 160 rectifies the voltage from the secondary winding S1 to provide a rectified voltage at the output of the asymmetrical power converter 100. Conventional rectifier topologies are familiar to those skilled in the art and, as a result, the operation of the rectifier 160 will not be described in detail.

The asymmetrical power converter 100 further includes an output filter 170, having first and second output inductors L1, L2 and an output capacitor Co, coupled to the output. The output filter 170 smooths and filters the rectified voltage for delivery to the load 190.

The asymmetrical power converter 100 still further includes a controller 130 for controlling the switching cycles of the first and second power switches Q1, Q2. The controller 130 activates the first power switch Q1 during a first interval for a first duty cycle (D) to impress the first voltage $V_{C1}$ across the first primary winding P1. The controller 130 then activates the second power switch Q2 during a second interval for a second duty cycle (1-D) to impress the second voltage $V_{C2}$ across the second primary winding P2. The controller 130 monitors the output voltage Vout and activates the first and second power switches Q1, Q2 to regulate the output voltage Vout.

The asymmetrical power converter 100 operates as follows. During the first interval, the controller 130 activates the first power switch Q1 to impress the first voltage $V_{C1}$ across the first primary winding P1. The first circulation path thus transfers power from the input of the asymmetrical power converter 100 to the isolation transformer T1. The first rectifying diode D1 conducts as current from the first output inductor L1 flows to the output through the first rectifying diode D1 and the output capacitor Co. Current in the second output inductor L2 flows to the output through the secondary winding S1, the first rectifying diode D1 and the output capacitor Co. Then, as the first interval ends, the controller 130 deactivates the first power switch Q1. Since the first power switch Q1 is now not conducting, a current in the first and second primary windings P1, P2 charges the intrinsic capacitance of the first power switch Q1. The intrinsic capacitance of the second power switch Q2 gradually discharges until a voltage across the second power switch Q2 is substantially zero. The controller 130 now activates the second power switch Q2 with substantially zero volts thereacross. A small delay period between the deactivation of the first power switch Q1 and the activation of the second power switch Q2 allows zero voltage switching (ZVS) to be employed to reduce voltage stress across the second power switch Q2.

The second power switch Q2 conducts during the second interval to impress the second voltage $V_{C2}$ across the second primary winding P2. The second circulation path thus transfers further power from the input to the isolation transformer T1. The second rectifying diode D2 conducts as current from the second output inductor L2 flows to the output through the second rectifying diode D2 and the output capacitor Co. Current in the first output inductor L1 now flows to the output through the secondary winding S1, the second rectifying diode D2 and the output capacitor Co. The controller 130 then deactivates the second power switch Q2 at the end of the second interval. Since the second power switch Q2 is now not conducting, the current in the first and second primary windings P1, P2 charges the intrinsic capacitance of the second power switch Q2. The intrinsic capacitance of the first power switch Q1 gradually discharges until a voltage thereacross is substantially zero. The controller 130 may now activate the first power switch Q1 with substantially zero volts thereacross, thereby employing ZVS to reduce the voltage stress across the first power switch Q1.

While a small dead time between conduction periods of the first and second power switches Q1, Q2 is desirable to allow for ZVS, a current surge may result if the first and second power switches Q1, Q2 are activated simultaneously. In the illustrated embodiment, the series-coupled first and second primary windings P1, P2 are coupled between the first and second power switches Q1, Q2. The leakage inductance of the isolation transformer T1 thus protects the first and second power switches Q1, Q2 from shoot-through currents resulting from simultaneous conduction of the first and second power switches Q1, Q2. Co-pending patent application Serial No. 09/072,389, entitled "Cross-conduction Limiting Circuit, Method of Operation Thereof and DC/DC Converter Employing the Same," to Mandelcorn, et al., commonly assigned with the present invention and incorporated herein by reference, describes the use of an inductive element, coupled between the first and second controllable switches, that limits a flow of cross-conduction currents between the first and second controllable switches when the first and second controllable switches are simultaneously conducting. While Mandelcorn provides a solution to current shoot-through caused by simultaneous conduction of the first and second switches, the circuit does not reduce reverse voltage stress on the rectifying diodes of the rectifier.

In the present application, the differing turns ratios of the first and second primary windings P1, P2 with respect to the secondary winding S1, in conjunction with the asymmetrical operation of the first and second power switches Q1, Q2, allow the hyperbolic relationship between the duty cycle and voltage conversion ratio to be altered. The asymmetrical power converter 100 may thus possess a higher voltage conversion ratio to thereby reduce reverse voltage stress on the rectifying diodes D1, D2 of the rectifier 160. Altering the hyperbolic relationship also allows the asymmetrical power converter 100 of the present invention to be operated at a substantially 50% duty cycle to more evenly distribute power dissipation between the first and second power switches Q1, Q2.

Figure 2:
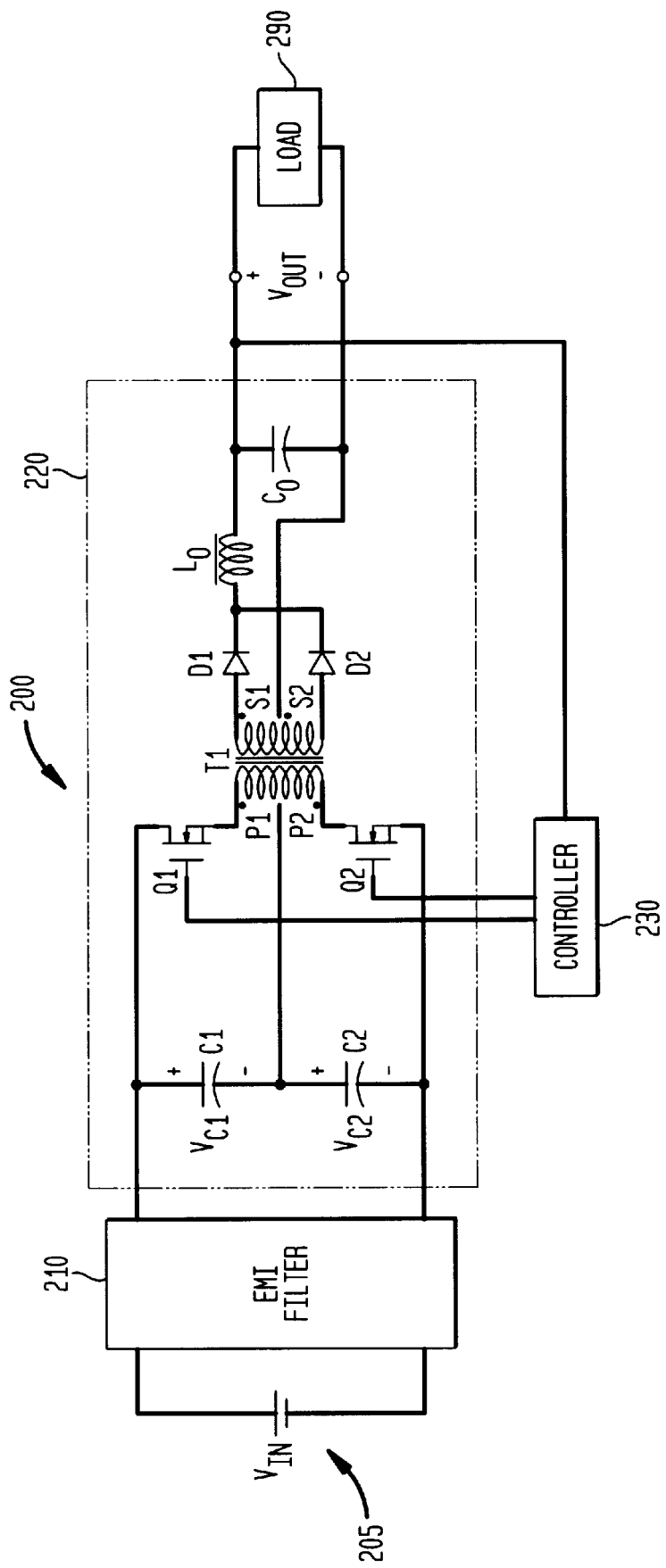
FIG. 2 illustrates an embodiment of a power supply constructed in accordance with the principles of the present invention.

Turning now to FIG. 2, illustrated is an embodiment of a power supply 200 constructed in accordance with the principles of the present invention. The power supply 200 includes an electromagnetic interference (EMI) filter 210 couplable to a source of electrical power 205. The EMI filter 210 filters the input power to the power supply 200 and also isolates the source of electrical power 205 from noise generated within the power supply 200. Conventional EMI filters are familiar to those skilled in the art and, as a result, the EMI filter 210 will not be further described. The power supply 200 further includes an asymmetrical power converter 220, coupled to the EMI filter 210. The power supply 200 still further includes a controller 230, coupled to the asymmetrical power converter 220, that regulates the output voltage Vout at an output of the power supply 200.

The asymmetrical power converter 220 includes an isolation transformer T1 having series-coupled first and second primary windings P1, P2. The isolation transformer T1 further has series-coupled first and second secondary windings S1, S2. In the illustrated embodiment, the first and second primary windings P1, P2 have differing numbers of turns while the first and second secondary windings S1, S2 have the same number of turns. A first turns ratio of the first primary winding P1 to the first secondary winding S1 is, therefore, different from a second turns ratio of the second primary winding P2 to the second secondary winding S2.

The asymmetrical power converter 220 further includes first and second power switches Q1, Q2 series-coupled to the first and second primary windings P1, P2, respectively. The asymmetrical power converter 220 further includes first and second input capacitors C1, C2. The first input capacitor C1 is coupled across the first power switch Q1 and the first primary winding P1 while the second input capacitor C2 is coupled across the second power switch Q2 and the second primary winding P2. The first and second input capacitors C1, C2 establish first and second voltages $V_{C1}$, $V_{C2}$ thereacross, respectively.

The asymmetrical power converter 220 further includes a center-tapped rectifier having first and second rectifying diodes D1, D2 coupled to the first and second secondary windings S1, S2, respectively. The rectifier rectifies the voltage from the first and second secondary windings S1, S2 to provide a rectified voltage at the output of the power supply 200. Conventional rectifier topologies such as the center-tapped rectifier are familiar to those skilled in the art and, as a result, the operation of the rectifier will not be described in detail. Additionally, while the illustrated embodiment employs a center-tapped rectifier, other rectifier topologies are well within the broad scope of the present invention. The asymmetrical power converter 220 further includes an output filter, having an output inductor Lo and an output capacitor Co, coupled between the rectifier and the output of the power supply 200. The output filter smooths and filters the rectified voltage for delivery to the load 290.

The power supply 200 operates as follows. During the first interval, the controller 230 activates the first power switch Q1 to impress the first voltage $V_{C1}$ across the first primary winding P1. Current in the output inductor Lo flows to the output through the output capacitor Co, the first secondary winding S1 and the first rectifying diode D1. Then, as the first interval ends, the controller 230 deactivates the first power switch Q1. Since the first power switch Q1 is now not conducting, current in the first and second primary windings P1, P2 charges the intrinsic capacitance of the first power switch Q1. The intrinsic capacitance of the second power switch Q2 gradually discharges until a voltage across the second power switch Q2 is substantially zero. The controller 230 now activates the second power switch Q2 with substantially zero volts thereacross. A small delay period between the deactivation of the first power switch Q1 and the activation of the second power switch Q2 allows ZVS to be employed to reduce voltage stress across the second power switch Q2.

Then, during the second interval, the second power switch Q2 conducts to impress the second voltage $V_{C2}$ across the second primary winding P2. Current in the output inductor Lo now flows to the output through the output capacitor Co, the second secondary winding S2 and the second rectifying diode D2. At the end of the second interval, the controller 230 deactivates the second power switch Q2. Since the second power switch Q2 is now not conducting, the current in the first and second primary windings P1, P2 charges the intrinsic capacitance of the second power switch Q2 and gradually discharges the intrinsic capacitance of the first power switch Q1 until a voltage thereacross is substantially zero. The controller 230 may now activate the first power switch Q1 with substantially zero volts thereacross, thereby employing ZVS to reduce voltage stress across the first power switch Q1.

The differing turns ratios of the first and second primary windings P1, P2 with respect to the first and second secondary winding S1, S2, in conjunction with the asymmetrical operation of the first and second power switches Q1, Q2 enable a higher voltage conversion ratio relative to the duty cycle. The higher voltage conversion ratio in turn enables a higher output voltage for a given input voltage. The input voltage may therefore be reduced to thereby reduce reverse voltage stress on the rectifying diodes D1, D2 of the rectifier. Altering the relationship between the voltage conversion ratio and the duty cycle also allows the power supply 200 of the present invention to be operated at a substantially 50% duty cycle to more evenly distribute power dissipation between the first and second power switches Q1, Q2.

Those skilled in the art should understand that the previously described embodiments of the asymmetrical power converter are submitted for illustrative purposes only and other embodiments capable of providing reduced reverse voltage stress across the rectifying diodes of the rectifier or more evenly distributing power dissipation between the first and second power switches are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of a variety of power converter topologies, see *Power Electronics: Converters, Applications and Design*, by N. Mohan, T. M. Undeland and W. P. Robbins, John Wiley & Sons, Inc. (1989), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. An asymmetrical power converter, comprising:
   a single isolation transformer having series-coupled first and second primary windings providing differing turns ratios therefrom;
   a first power switch and a first input capacitor series-coupled to said first primary winding to form a first circulation path between said isolation transformer and an input of said asymmetrical power converter; and
   a second power switch and a second input capacitor series-coupled to said second primary winding to form a second circulation path between said isolation transformer and said input.

2. The asymmetrical power converter as recited in claim 1 further comprising a controller, coupled to said first and second power switches, that alternately activates said first and second power switches to impress power from said input onto said isolation transformer.

3. The asymmetrical power converter as recited in claim 1 further comprising a rectifier coupled to an output of said asymmetrical power converter, said rectifier providing a rectified output voltage at said output.

4. The asymmetrical power converter as recited in claim 3 wherein said rectifier is selected from the group consisting of:
   a current doubler rectifier, and
   a center-tapped rectifier.

5. The asymmetrical power converter as recited in claim 1 wherein said first and second power switches are selected from the group consisting of:
   metal oxide semiconductor field-effect transistors (MOSFETs),
   bipolar junction transistors (BJTs),
   insulated gate bipolar transistors (IGBTs), and
   gate turn-off thyristors (GTOs).

6. The asymmetrical power converter as recited in claim 1 further comprising an output filter, coupled to an output of said asymmetrical power converter.

7. The asymmetrical power converter as recited in claim 6 wherein said output filter comprises an output inductor and an output capacitor.

8. A method of operating an asymmetrical power converter, comprising:
   transferring power from an input of said asymmetrical power converter to a single isolation transformer via a first circulation path having a first power switch and a first input capacitor series-coupled to a first primary winding of said isolation transformer; and
   transferring further power from said input to said isolation transformer via a second circulation path having a second power switch and a second input capacitor series-coupled to a second primary winding of said isolation transformer, said first and second primary windings being series-coupled and providing differing turns ratios therefrom.

9. The method as recited in claim 8 further comprising alternately activating said first and second power switches.

10. The method as recited in claim 8 further comprising rectifying an output voltage at an output of said asymmetrical power converter with a rectifier, coupled to said output.

11. The method as recited in claim 10 wherein said rectifier is selected from the group consisting of:
   a current doubler rectifier, and
   a center-tapped rectifier.

12. The method as recited in claim 8 wherein said first and second power switches are selected from the group consisting of:
   metal oxide semiconductor field-effect transistors (MOSFETs),
   bipolar junction transistors (BJTs),
   insulated gate bipolar transistors (IGBTs), and
   gate turn-off thyristors (GTOs).

13. The method as recited in claim 8 further comprising filtering an output voltage of said asymmetrical power converter.

14. The method as recited in claim 13 wherein said filtering is performed by an output inductor and an output capacitor.

15. A power supply comprising:
   an electromagnetic interference filter, couplable to a source of electrical power;
   an asymmetrical power converter, including:
      a single isolation transformer having series-coupled first and second primary windings providing differing turns ratios therefrom;
      a first power switch and a first input capacitor series-coupled to said first primary winding to form a first circulation path between said isolation transformer and an input of said asymmetrical power converter; and
      a second power switch and a second input capacitor series-coupled to said second primary winding to form a second circulation path between said isolation transformer and said input; and
   a controller, coupled to said first and second power switches, that alternately activates said first and second power switches to impress power from said input onto said isolation transformer.

16. The power supply as recited in claim 15 further comprising a rectifier coupled to an output of said asymmetrical power converter, said rectifier providing a rectified output voltage at said output.

17. The power supply as recited in claim 16 wherein said rectifier is selected from the group consisting of:
   a current doubler rectifier, and
   a center-tapped rectifier.

18. The power supply as recited in claim 15 wherein said first and second power switches are selected from the group consisting of:
   metal oxide semiconductor field-effect transistors (MOSFETs),
   bipolar junction transistors (BJTs),
   insulated gate bipolar transistors (IGBTs), and
   gate turn-off thyristors (GTOs).

19. The power supply as recited in claim 15 further comprising an output filter, coupled to an output of said asymmetrical power converter.

20. The power supply as recited in claim 19 wherein said output filter comprises an output inductor and an output capacitor.

* * * * *